United States Patent [19]

McKeever et al.

[11] Patent Number: 5,892,234

[45] Date of Patent: Apr. 6, 1999

[54] METHOD FOR DETERMINING AN UNKNOWN ABSORBED DOSE OF RADIATION USING OPTICALLY STIMULATED LUMINESCENCE

[75] Inventors: Stephen W. S. McKeever; Mark S. Akselrod, both of Stillwater, Okla.; Brian G. Markey, Roskilde, Denmark

[73] Assignee: The Board of Regents of Oklahoma State University, Stillwater, Okla.

[21] Appl. No.: 710,780

[22] Filed: Sep. 20, 1996

Related U.S. Application Data

[60] Provisional application No. 60/006,140 Sep. 22, 1995.

[51] Int. Cl.$^6$ .............................. G01T 1/105; G01N 21/64
[52] U.S. Cl. ...................................... 250/459.1; 250/484.5
[58] Field of Search ................................ 250/484.5, 337, 250/459.1, 458.1, 461.1, 484.2, 484.4

[56] References Cited

U.S. PATENT DOCUMENTS

| | | |
|---|---|---|
| 4,507,562 | 3/1985 | Gasiot et al. . |
| 4,517,463 | 5/1985 | Gasiot et al. . |
| 4,638,163 | 1/1987 | Braunlich et al. . |
| 4,839,518 | 6/1989 | Braunlich et al. . |
| 4,906,848 | 3/1990 | Braunlich et al. . |
| 4,954,707 | 9/1990 | Miller et al. . |
| 4,999,504 | 3/1991 | Braunlich et al. . |
| 5,025,159 | 6/1991 | Miller et al. . |
| 5,041,734 | 8/1991 | Tetzlaff et al. . |
| 5,081,363 | 1/1992 | Tetzlaff et al. . |
| 5,091,653 | 2/1992 | Creager et al. . |
| 5,136,163 | 8/1992 | Miller et al. . |
| 5,196,704 | 3/1993 | Miller . |
| 5,272,348 | 12/1993 | Miller . |
| 5,354,997 | 10/1994 | Miller . |
| 5,567,948 | 10/1996 | Miller ................................... 250/484.5 |
| 5,569,927 | 10/1996 | Miller . |

FOREIGN PATENT DOCUMENTS

PCT/US92/10497  2/1992  WIPO .

OTHER PUBLICATIONS

"Pulsed Optically–Stimulated Luminescence Dosimetry using $\alpha-Al_2O_3$:C," S.W.S. McKeever, J.S. Akserlrod, and B.G. Markey; 11$^{th}$ International Conference on Solid State Dosimetry, presented at Hotel Helia Conference, Budapest, Hungary, Jul. 10–14, 1995.

Time–Resolved Optically Stimulated Luminescence From $\alpha-Al_2O_3$;C, B.G. Markey, L.E. Colyott, and S.W.S. McKeever, *Radiation Measurements*, vol. 00, No. 00, pp. 1–7, presented at International Symposium "LUMDETR '94", Sep. 25–29, 1994, Tallinn, Estonia.

(List continued on next page.)

*Primary Examiner*—Edward J. Glick
*Attorney, Agent, or Firm*—Fellers, Snider, Blankenship, Bailey & Tippens, P.C.

[57] ABSTRACT

A bimodal method for determining an unknown absorbed dose of radiation. An irradiated material is illuminated with ultraviolet or visible light and the luminescence which is emitted from the material is detected. The illuminating light is pulsed, with pulse widths varying from 1 ns to 500 ms. The luminescence emission from dosimetric traps is monitored after a delay following the end of the illumination pulse. The integrated luminescence signal is related to the initial absorbed dose of radiation and thus may be used to calculate the unknown absorbed dose after calibration. In a first mode, the material is completely detrapped—that is, all the dosimetric traps are emptied by the illumination beam. In a second mode the number of illumination pulses, each being followed by the time delay and by periods during which the luminescence signal is detected, is selected such that only a portion of the radiation-induced luminescence from the material is extracted.

14 Claims, 6 Drawing Sheets

OTHER PUBLICATIONS

Rao et al., "Optically Stimulated Luminescence of Mixed Alkaline Earth Sulphide Phosphors", *International Journal of Radiation Applications and Instrumentation Part D*, 18 (1991) No. 3, Headington Hill Hall, GB, pp. 287–289.

Kalninsh, A. et al., Powdered KBr–IN as an Effective X-Ray Storage Material with a Wide Dynamic Range, pp. 259–268 (No Date).

Plavina, I et al., Photostimulated Luminescence of KBr–IN Induced by Excitation with UV Radiation pp. 253–257 (No Date).

Dance, R. David, Storage Phosphor Plates and Xerox Receptors, 1994;IOP Publishing Ltd, pp. 75–87.

H. Von Seggern, M. Thomas et al., Spatial Correlation and Photostimulability of Defect Centers in the X-Ray Storage Phosphor BaFBr:$Eu^{2+}$, 1991; The American Physical Society, vol. 44, No. 17 pp. 9240–9247.

Trinkler, L.E. et al., Stimulation Energy of the X-Ray Storage Material KBr:IN, 1993; Phy.Stat.Sol.(b) K31–K34.

Braslavets, P. et al., Proceedings of the International Congress of Photographic Science 1990 (ICPS'90), Oct. 15–19, 1990, Beijing, China, 1990, The Advancement of Imaging Science and Technology, International Academic Publishers, pp. 474–476.

Gurvich,A.M. et al., Photostimulable Luminescence Screens and Their Application in Clincal Dosimetry, Radiation Protection Dosimetry, (1990) vol. 34, No. 1/4 pp. 265–267, Nuclear Technology Publishing.

Schipper, W.J., Trapping of Electrons By $H^+$ in the X-Ray Storage Phosphor $Ba_3(PO_4):Eu^{2+},La^{3+}$, J.Phys.D:Appl.Phys. (1993) vol. 26 pp. 1487–1492.

Schipper, W.J. et al., The X-Ray Storage Properties of Barium Phosphate Doped with Trivalent Rare Earth Ions, Phys. Stat. Sol. (a) (1994), vol. 141, pp. 231–238.

Thoms, M. et al., Optical and Thermal Properties of Electron-and Hole-Trapping Sites in the X-Ray Storage Phosphor Rbl:$X(X\times Tl^+,In^+Pb^{2+}Eu^{2+})$, (1994) pp. 1800–1808.

Schipper, W.J., Luminescence of $Eu^{2+}$–Activated Materials with Host Lattice $M_4OX_6$(M×Sr,Ba; X×Cl,Br), Material Chemistry and Physics (1991), 30 pp. 43–46.

Meijerink A, et al., Photostimulated Luminscence and Thermally Stimulated Luminescence of $Y_2SiO_5$–Ce,Sm, 1991 IOP Publishing Ltd, pp. 997–1002.

Rhyner, C.R., Miller, W.G. Radiation Dosimetry by Optically–Stimulated Luminescence of BeO *Health Physics* vol. 18 (Jun.), pp. 681–684.

Allen, P., McKeever, S.W.S. Studies of PTTL and OSL in TLD–400 *Radiation Protection Dosimetry* vol. 33 No. 1/4 pp. 19–22.

Burgkhardt, Piesch, Vilgis, Ishidoya and Ikegami, Modern Automatic Readout Systems for Phosphate Glass Dosemeters Using UV Laser Excitation *Radiation Protection Dosimetry* vol. 34 No. 1/4pp. 369–372 (1990).

Nanto, Murayama et al. Optically Stimulated Luminescence in KCI:EU Single Crystals *Radiation Protection Dosimetry* vol. 47 No. 1/4 pp. 281–284 (1993).

Nano, Usuda, Murayama et al Emission Mechanism of Optically Stimulated Luminescence N Copper–Doped Soeium Chloride Single Crystals *Radiation Protection Dosimetry* vol. 47 1/4 pp. 293–296 (1993).

Miller, S.D., Endres G.W.R. Laser–Induced Optically Stimulated M Centre Luminescence in LIF *Radiation Protection Dosimetry* vol. 33 No. 1/4 pp. 59–62 (1990).

Piesch, Burgkardt and Vilgis Photoluminescence Dosimetry; Progress and Present State of Art, *Radiation Protection Dosimetry* vol. 33 pp. 215–226 (1990).

METHOD FOR DETERMINING AN UNKNOWN ABSORBED DOSE OF RADIATION USING OPTICALLY STIMULATED LUMINESCENCE

STATEMENT REGARDING FEDERALLY SPONSORED RESEARCH

The present invention was partially supported through a grant from the National Science Foundation, grant #EHR-9108771. The government may have rights in this invention.

CROSS REFERENCE TO RELATED APPLICATION

This application claims the benefit of copending U.S. provisional application Ser. No. 60/004,140, filed on Sep. 22, 1995.

REFERENCE TO MICROFICHE APPENDIX

Not applicable.

BACKGROUND OF THE INVENTION

1. Technical Field:

This invention relates generally to luminescence techniques for radiation dosimetry, and, more specifically, to rapidly determining an unknown absorbed dose of radiation using optically stimulated luminescence.

2. Background:

Following its first demonstration as a dating tool by Huntley et al.,[1] optically stimulated luminescence (OSL) has developed into a popular technique among the geological dating community for the determination of equivalent doses in natural materials. The utility of the technique relies on the fact that the thermoluminescence (TL) signal from many natural materials is sensitive to light, and exhibits such light sensitive effects as light-induced fading, and phototransferred TL (PTTL). By exploiting this light sensitivity one can examine not only the loss of TL as a function of light exposure, but also one can monitor the luminescence emitted during light exposure, and use this luminescence signal as a dosimetric probe.

The application of OSL in personal and environmental dosimetry has been much less frequent. Although most of the popular TL materials exhibit light-induced effects there has been little exploitation of this as a dosimetric tool.[2] The main problem in OSL dosimetry arises from using a high intensity laser to stimulate an irradiated sample of a luminescent material compared to the very low intensity of luminescence that is to be detected from the material. Even the best interference filters and mirrors, like notch filters in combination with glass filters, partially transmit the intense laser light, and this leakage of stimulation light can be stronger than the OSL intensity by several orders of magnitude.

OSL measurements may be performed in two basic configurations—continuous wave (cw) or pulsed. In cw measurements, the luminescence is continually monitored during optical stimulation until all of the trapped charge is depleted. In existing pulsed OSL measurements, the luminescence is detected during the stimulating light pulse. However, existing methods for measuring OSL during continuous wave or pulsed light stimulation suffer from significant background signal interference caused by stimulation light leakage. Decreasing the stimulation light intensity results in longer data acquisition time requirements because the total luminescence output in general depends on the total amount of light delivered to the luminescent material.

It is thus an object of this invention to provide a method for achieving fast measurements with high sensitivity over a wide dynamic range of radiation doses without encountering significant background signal interference or stimulation light leakage.

SUMMARY OF THE INVENTION

The present invention encompasses measuring the optically stimulated luminescence generated from a luminescent material having a relatively long lifetime of luminescence using short pulses of laser light stimulation and measuring luminescence only between pulses of light stimulation and after a certain delay following the stimulation pulse.

High efficiency and fast luminescence measurements of radiation doses over a wide dynamic range are achieved by:

(a) quickly reaching a high population of excited state luminescence centers in an irradiated detector material using a sequence of pulses from an illumination beam (light pulses from a laser or flash lamp);

(b) keeping this high population of excited states for a long enough time to let a photodetector (particularly a PMT) relax after the illumination (or stimulation) pulse;

(c) measuring the OSL, induced by radiation, between illumination pulses with high efficiency, defined as a high luminescence yield with a low background signal and a small loss of luminescence signal during the pulse of illumination and during the PMT relaxation time; and (d) adjusting the illumination (laser) power and the number of illumination pulses to perform dose measurements in the dynamic range of at least seven (7) orders of magnitude and to prevent the saturation of the photodetector and/or photon counting system.

One aspect of the invention is a method for determining the absorbed dose of radiation from aluminum oxide materials based on the observation of optically stimulated luminescence from this material following exposure of the material to ionizing radiation. The method involves illuminating the irradiated material with ultraviolet or visible light of variable wavelength in the wavelength range 250 nm to 800 um, and detecting the luminescence which is emitted from the material. The luminescence emission may be of variable wavelength, in the wavelength range from 250 nm to 800 nm. The illuminating light is pulsed, with pulse widths varying from 1 ns to 500 ms. The luminescence emission is monitored after a delay following the end of the illumination pulse. The integrated luminescence signal is related to the initial absorbed dose of radiation and thus may be used to calculate the unknown absorbed dose after calibration.

The preferred method is bimodal in nature. An irradiated sample of a luminescent material, such as aluminum oxide, is mounted in the path of an illumination beam. The sample has a plurality of lattice defects and impurities which act as traps and luminescence centers. The lifetime of the luminescence centers is at least 15 $\mu s$ and the sample has a radiation-induced absorption within the wavelength range of stimulation of the traps of interest (the so-called "dosimetric traps"). The illumination beam is pulsed for a period of time that is at least 10 times smaller than the lifetime of the luminescence centers. It is important that the photon flux (photons/second/cm$^2$) of the illumination beam be insufficient to heat the luminescent material to a temperature above that which would cause thermal quenching of the luminescence centers nor above that which would cause the thermal emptying of the dosimetric traps (so producing thermoluminescence of the material). Irridation of the luminescent material induces coloration of the material and creates in the material a radiation-induced ability to absorb certain wavelengths of incident light. This phenomena can be observed by monitoring the amount of light absorbed by the irradiated material as a function of the wavelength of the incident illuminating light. In the present invention it is important that the wavelength of the illumination beam be within the wavelength range of this radiation-induced absorption ability. It is also necessary that the chosen wavelength does not produce photoionization of, or luminescence from, unirradiated material. A luminescence signal emitted from said luminescent material is detected with a photodetector after a time delay following the pulsing of the illumination beam. The luminescence signal being emitted is of a wavelength different from the wavelength of the illumination beam. The time delay serves the purpose of allowing the photodetector to relax after the stimulation pulse.

In a first mode, the sample is completely detrapped—that is, all the traps are emptied by the illumination beam. The number of illumination pulses, each being followed by the time delay and by periods during which the luminescence signal is detected, and the total illumination light energy is selected such as to completely, or almost completely, extract all radiation-induced luminescence from the sample.

Absorbed dose re-estimation is available when the system is operated in a second mode. In this mode the number of illumination pulses, each being followed by the time delay and by periods during which the luminescence signal is detected, is selected such that only a portion of the radiation-induced luminescence from the sample is extracted, the amount of the illumination light energy being precisely measured and determined in order to perform two or more measurements on the same sample after the same irradiation.

In either of the two modes, the luminescence signal is compared with calibrated luminescence signals attributable to known doses of irradiation in order to determine the unknown absorbed dose of irradiation.

In one aspect of the preferred bimodal method, two or more illumination beams having different wavelengths are pulsed to stimulate two or more sets of other traps having different optical depths.

In another aspect of the preferred bimodal method, the intensity of the illumination beam is adjusted commensurate with the dose range being studied in order to achieve a dynamic range of absorbed dose of at least seven (7) orders of magnitude.

A better understanding of the invention and its objects and advantages will become apparent to those skilled in this art from the following detailed description, taken in conjunction with the attached drawings, wherein there is shown and described only the preferred embodiment of the invention, simply by way of illustration of the best mode contemplated for carrying out the invention. As will be realized, the invention is capable of modifications in various obvious respects, all without departing from the invention. Accordingly, the description should be regarded as illustrative in nature and not as restrictive.

DETAILED DESCRIPTION OF THE PREFERRED EMBODIMENT

Figure 1:
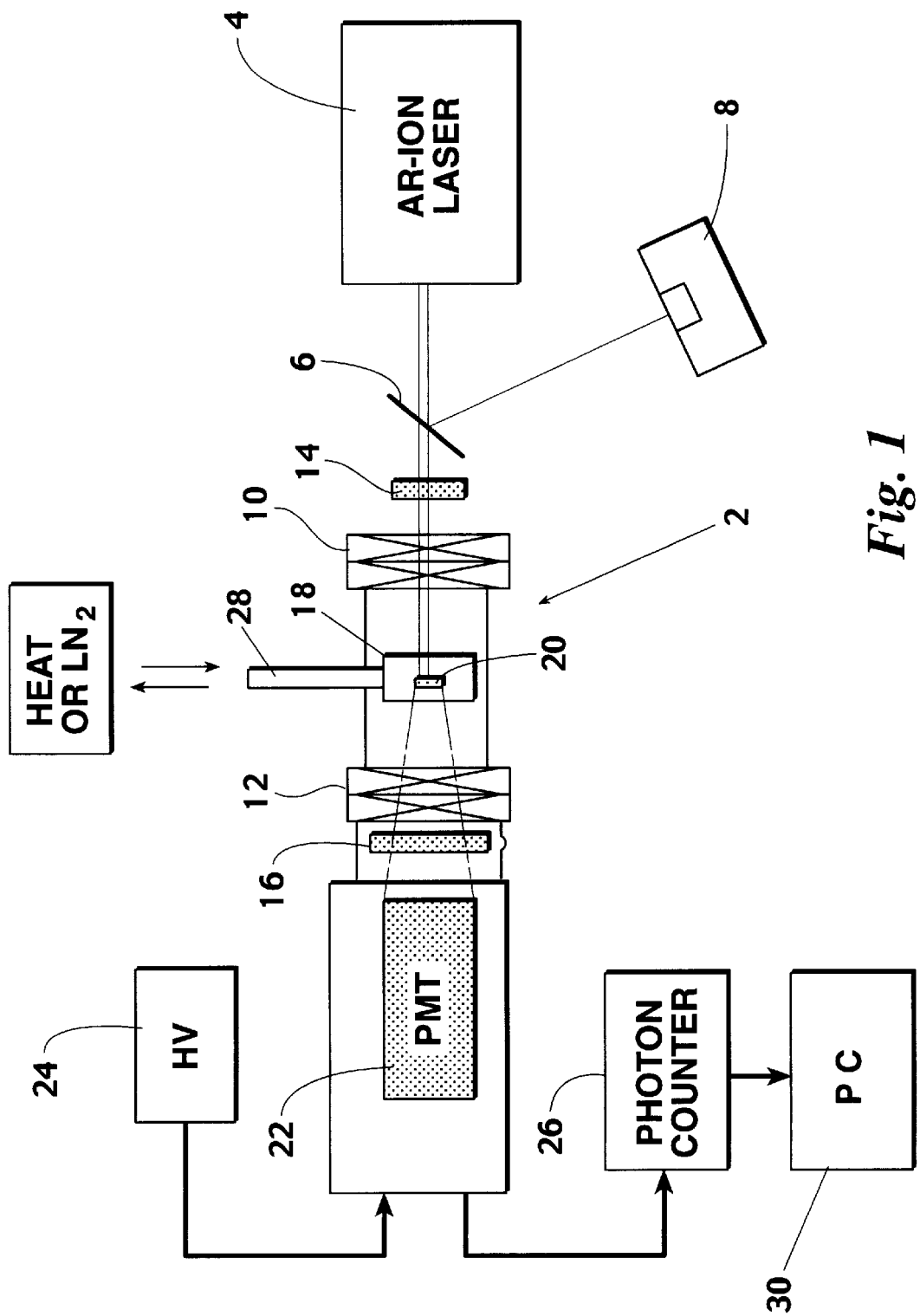
FIG. 1 is a schematic of a pulsed-OSL (POSL) system.

Before explaining the present invention in detail, it is to be understood that the invention is not limited in its application to the details of the construction and arrangement of steps illustrated herein. The invention is capable of other embodiments and of being practiced or carried out in a variety of ways. It is to be understood that the phraseology and terminology employed herein is for the purpose of description and not of limitation.

In general, an irradiated sample of an acceptable luminescent material, such as aluminum oxide, is mounted in the path of a beam of ultraviolet or visible light (the illumination beam). The illumination beam may vary in wavelength from 250 nm to 800 nm. The illumination beam is pulsed, with pulsed widths varying from 1 ns to 500 ms. Although the emission from the sample can be detected simultaneously with the illumination using filters to discriminate between the illumination light and the emission light ("filter" mode; Mode I, FIG.2), the preferred embodiment of this invention is to monitor the emission light after the end of the illumination period, with or without using filters ("non-filter" mode; Mode II, FIG. 2).

The integrated luminescence emission, integrated over a predefined period ranging from nanoseconds to seconds, can be calibrated by irradiating the material to different known doses of ionizing radiation and monitoring the luminescence intensity that results from the radiation exposure. Unknown doses of radiation may therefore be determined from a comparison of the luminescence emission from the unknown dose with that which results from the calibrated exposures.

The method works in the following way: Irradiation excites free electronic charge carriers (electrons and holes) in the material. The free charge carriers become trapped at lattice defects (traps or luminescence centers) within the material. The lattice defects may be pre-existing (impurities, vacancies, interstitial ions, and complexes of these) or may be created by the radiation itself. The trapped charge is localized at the defects for time periods varying from seconds to years, depending upon the temperature. The stable trapped charges (i.e. at other defects) when stimulated via the absorption of light, are freed from the traps and recombine with charges of opposite polarity at the luminescence centers. This results in the emission of light from the sample. The intensity of the light emitted is proportional to the initial dose absorbed.

This invention utilizes several new features not previously exploited in other similar applications published in the literature. These include: (a) the use of pulsed illumination to release trapped charges from defects followed by a short delay before measuring the emitted light; (b) the use of multiple wavelengths to select different groups of dosimetric traps; and (c) the use of laser beams of different powers to extend the dynamic range.

Existing similar technology uses either:

(i) Continuous illumination of the irradiated sample with the simultaneous detection of emitted light using filters to discriminate between the illumination light and the emitted light; or (ii) Radiophotoluminescence (RPL), where pulsed illumination of photosensitive defects raises these defects into an excited energetic state, which is followed by the realization of the excited state, along with the subsequent emission of light. The photosensitive defects are radiation-induced.

(iii) Laser heated thermoluminescence (TL), where an intense pulse of laser light is absorbed by either the luminescent material or by a substrate and, as a result, the luminescent material is heated to produce TL.

(iv) Pulsed OSL with simultaneous measurement of luminescence, where the sample is pulsed with a stimulating light source and the luminescence is measured during the stimulation phase.

The advantages of the new proposed pulsed illumination over the continuous illumination are: (a) the intense laser pulse allows fast dose measurement by achieving a high population of excited states of the luminescence centers (by charge transfer and recombination) during the pulse and acquiring the emission light with a high signal-to-noise ratio between the pulses of illumination; (b) the amount of charge released depends upon the width of the excitation pulse and the intensity of the illuminating light. For certain illumination conditions the illumination does not free all charges from the defects. A proportion of the trapped charge population only may be released. This gives the ability to re-illuminate the samples and to monitor the emission multiple times. This in turn gives the ability to "re-read" the dosimeter if necessary; (c) in contrast, by using high illuminating intensities, all of the trapped charge population may be released within a fraction of a second. This gives the ability to read the dosimeter very quickly and creates the ability to read many thousands of dosimeters within a short time frame; (d) the use of filters is not required in the non-filter mode. This enhances sensitivity. The invention produces sensitivity increases over conventional thermoluminescence dosimetry by factors up to 100; and (e) the laser power may be adjusted to the level most appropriate to the range of absorbed dose, thereby increasing the dynamic range of the measurement.

RPL differs from the present invention in that release of trapped charges from the defects does not take place (i.e., ionization does not occur) and thus a different physical process is being exploited. In the RPL technique, pulsed UV excitation produces intracenter luminescence even in unirradiated samples. The radiation-induced signal is observed only on the tail of the luminescence decay. This results in a low signal-to-noise ratio and a correspondingly high detection threshold for the absorbed dose. The proposed method, which utilizes optical stimulation of materials with trapped charge carriers and their transport to luminescence centers, does not produce luminescence of an unirradiated detector and has a very low dose detection threshold.

The present invention also utilizes different wavelengths in the illumination beam. By using different wavelengths in the excitation beam one can selectively free charges from different defects (traps). Wavelengths in the range 400 nm to 550 nm are used to empty charges from the so-called "dosimetric traps" and light in the wavelength region from 250 nm to 400 nm is used to empty charges from the so-called "deep traps". Thus, by illuminating an irradiated sample to say 500 nm light, one may read the luminescence signal due to the release of the charge from the "dosimetric traps" only. A subsequent second illumination with light of say 400 mm will result in the ability to read the luminescence signal caused by the release of trapped charge from the "deep traps". Each signal may be calibrated and used to evaluate the absorbed dose. A second method to re-read the absorbed dose using dual wavelength illumination is accordingly provided.

Existing patents and scientific publications disclosing OSL systems, especially systems used in radiation imaging, focus on the usage of luminescent materials with very short luminescence lifetimes on the order of 1–10 $\mu$s. Short luminescence lifetime for radiation imaging is a very important requirement, needed to minimize the data acquisition time per one image constructed from about 1 million pixels. If one uses only one laser pulse per image pixel and a data acquisition time on the order of 3 luminescence lifetimes (30 $\mu$s), the total time needed per image is about 30 seconds.

As opposed to radiation imaging, in personal and environmental dosimetry applications it would be advantageous to utilize a luminescent material having a luminescence lifetime sufficiently long to allow one to measure luminescence between pulses of light stimulation and achieve fast measurements with high sensitivity over a wide dynamic range of radiation doses.

Markey et al., in the publication *Time-Resolved, Optically Stimulated Luminescencefrom $\alpha$-Al$_2$O$_3$:C*, Radiat. Meas. Vol. 24,[5] (set out verbatim in the provisional application from which this application claims the benefit, the same being incorporated by reference herein) describe some of the basic properties of pulsed-OSL (POSL) methods. These earlier studies were followed up and investigation continued into the POSL signal as a functions of stimulation pulse wavelength, power and duration. Hereinbelow, the low-dose capability and the dynamic range of the present invention is demonstrated and the flexibility afforded by this measurement technique in dosimetry applications is discussed.

$\alpha$-Al$_2$O$_3$:C is an extremely sensitive TL material,[3] but suffers from two potential problems which hinder its routine use in some thermoluminescence dosimetry (TLD) applications, including laser-heated TL. Firstly, the TL signal suffers from thermal quenching in which the luminescence efficiency is reduced as the temperature is increased. Secondly, the TL signal is extremely sensitive to light. As with other materials the light sensitivity is apparent as light-induced fading of the TL signal and in the manifestation of PTTL, but, in addition, a light-induced generation of the TL signal can be observed if an unirradiated sample is exposed to UV light.[3] The latter is due to excitation of charge carriers from intrinsic defects (e.g. F-centers[4]). The high TL sensitivity of this material, coupled with the strong light-induced fading, highlights this material as a candidate for development in OSL dosimetry. OSL methods are especially appropriate for this material because, by avoiding the need to heat the material, one also forestalls the problem of thermal quenching. Consequently, Markey at al. demonstrated that the OSL from $\alpha$-Al$_2$O$_3$:C, when stimulated with the 514 nm line from an Ar-ion laser, can be used for ultra-low dose measurements and highlighted the potential for dosimetry.

Experiments conducted demonstrate that by using pulsed-OSL (POSL) with α-Al$_2$O$_3$:C detectors, light output several times higher than the TL output can be achieved. Dependencies of the POSL signal on the dose of irradiation, and the parameters of laser stimulation (wavelength, power, pulse duration) are presented and discussed hereinbelow. The conclusion is made that POSL, using α-Al$_2$O$_3$:C is a very sensitive, fast and flexible technique for use in dosimetry.

EXPERIMENTS

1. Experimental Details

A schematic of a pulsed optically stimulated luminescence (POSL) measurement system is shown in FIG. 1. The system 2 includes: an Ar-ion laser 4; a beam splitter 6; a power meter 8; shutters 10 and 12; filters 14 and 16; a cryostat 18; a temperature control system 28 for cooling the sample 20 with liquid nitrogen or for heating sample 20; a photomultiplier tube (PMT) 22; a high voltage input 24 to the PMT 22; a photon counter 26; and a personal computer 30. In the design shown the POSL is monitored in "transmission geometry" in which the POSL is detected from the opposite side of the sample from which it is stimulated. This allows for an efficient light-collection geometry. However, the sample can also be mounted in "reflection geometry" in which the light is collected from the same side as it is stimulated without any loss of generality. Furthermore, the sample can be either heated, or cooled with liquid nitrogen. Measurements over a wide temperature range (100 K to 600 K) are possible. A cw Ar-ion laser (6 W all lines) was used as a light source for stimulation of the luminescence from the irradiated samples. Computer-controlled shutters provided a pulse of stimulation light on to the sample, and also opened the PMT for measurement of the emission, either during or after the laser pulse. The number of pulses can be controlled using, for example, an electronic shutter, a mechanical shutter, a beam polarizer or a liquid crystal modulator. Alternatively, the laser light could be switched using an acousto-optic modulator. By varying the power of the laser the POSL signal could be monitored over seven decades of dose. The apparatus also allowed for back-to-back comparisons of the POSL sensitivity with that of TL and phototransferred TL (PTTL, also known as cooled optically stimulated luminescence, COSL[6]). Depending on the conditions of measurement, the POSL was found to be up to 10 times more sensitive than either TL or COSL.

Figure 2:
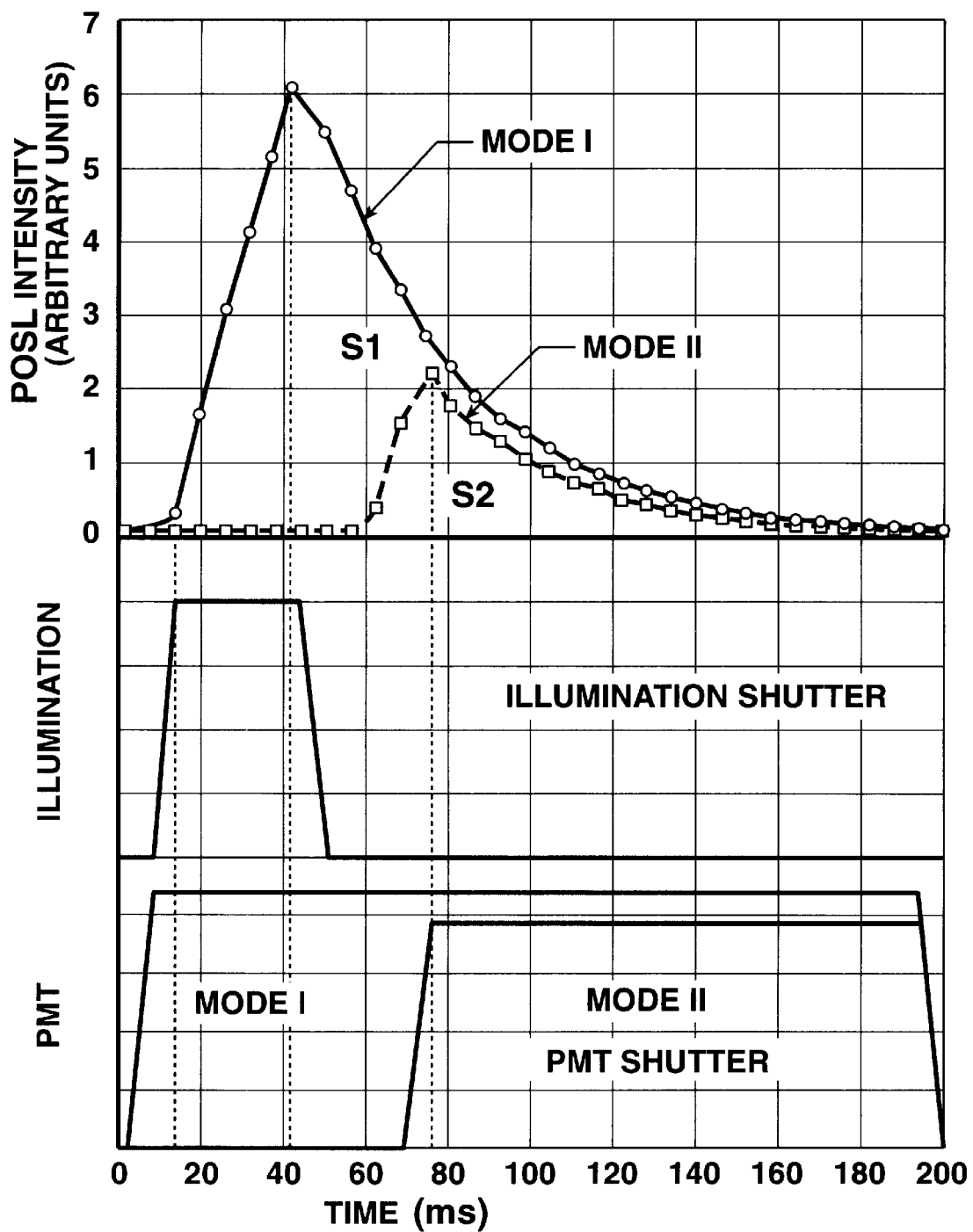
FIG. 2 is a timing diagram for the POSL measurements illustrating two possible modes of operation.

In the experiments, two different modes of operation were realized, as illustrated in FIG. 2. In "Mode I" the POSL signal was monitored during and after the pulse of illumination. To separate the stimulation light from the emission light two 420 nm interference filters were used in front of the PMT. This mode was used primarily for high dose measurements and kinetic analysis of the POSL process. Leakage of light through the filters made it difficult to use this mode to investigate signals of low intensity and to perform low dose measurements.

In "Mode II" the PMT was closed during illumination and data acquisition was initiated 20 ms after closure of the shutter. Only a broad-band filter centered at 400 nm was needed in this mode of operation. Use of this measurement mode resulted in a decrease in both the background signal and the minimum measurable dose. In both modes of operation the decay of the luminescence "afterglow" (after the end of the laser pulse) was monitored using photon counting with a gate time from 1 to 10 ms, and a 2 ms dwell time between gates. The afterglow decay was observed to have at least two decay constants.[5] The first had a temperature-independent time-constant of ~35 ms (i.e. the F-center lifetime) and the second had a temperature-dependent time-constant varying from 400 to 5000 ms. The temperature-dependent component was phosphorescence due to shallow traps.[5,7]

Figure 3:
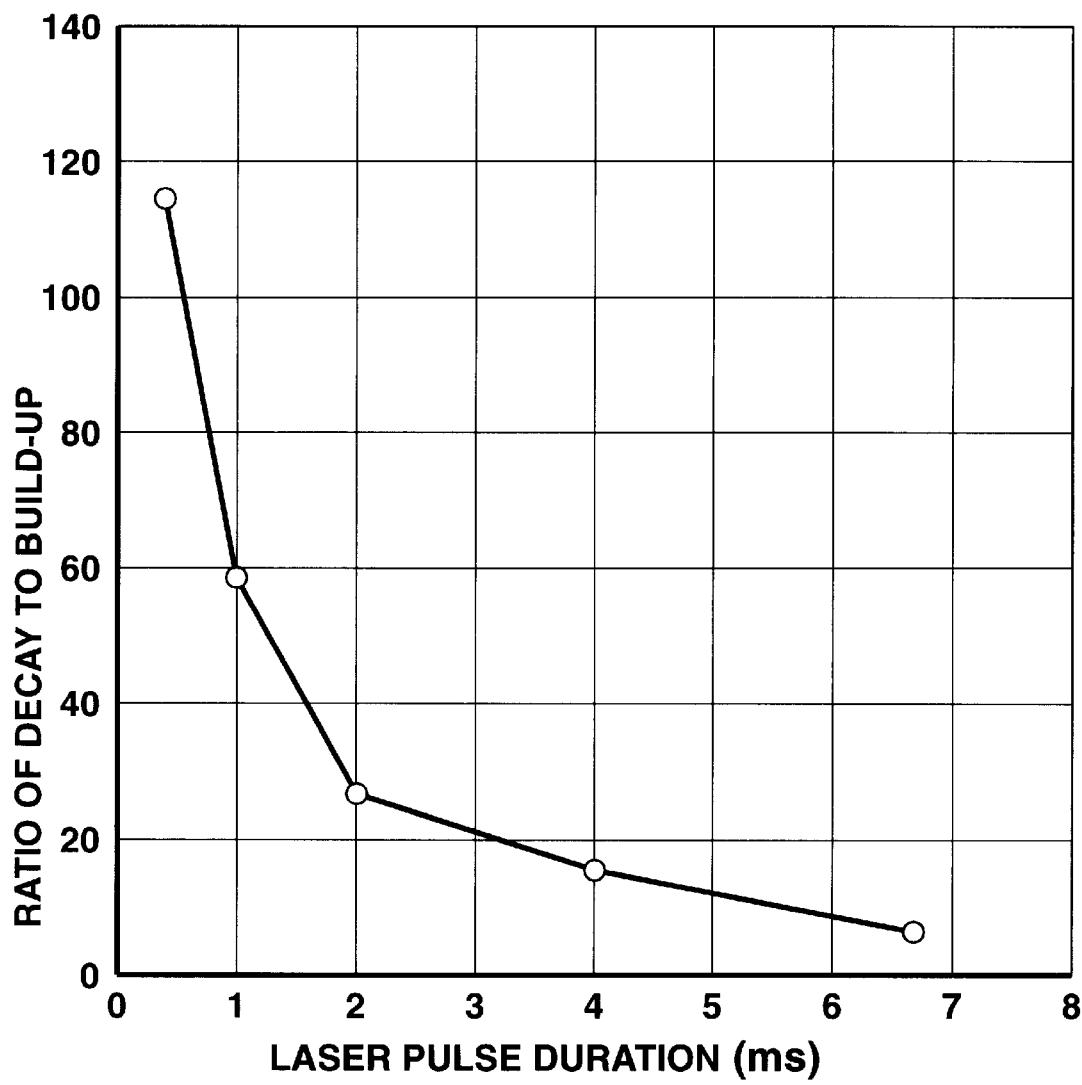
FIG. 3 is a graph of efficiency data (expressed as the ratio $I_2/I_1$,) as a functions of pulse width, for either constant laser power or constant laser energy. The data illustrated were taken with a laser power of 237 mW. Data taken with constant energy (0.237 mJ) gave identical results.

As noted above "Mode II" was the normal mode of operation at low doses. In this mode, the luminescence emitted during the laser pulse was "lost". Therefore, the most efficient procedure is to minimize light lost during the pulse and maximize the light collected after the pulse. By letting $I_1$ be the integrated light emitted during the pulse, and, $I_2$ be the integrated light emitted after the pulse, it is necessary to investigate which combination of pulse width and laser power will maximize the ratio $I_2/I_1$. Assuming a constant rise and decay constant of 35 ms, a simple analysis reveals that short pulses of high power light will lead to the largest values for $I_2/I_1$. To prove this consideration, experimental data were collected using "Mode I" in which we could measure both the build-up and the decay signals. The duration of the laser pulse was varied from 1 to 40 ms and was controlled in this instance using the acousto-optic modulator. The data were acquired using a La Croy digital oscilloscope. FIG. 3 shows the variation of the measured ratio $I_2/I_1$, as a function of pulse width. The data was taken either under conditions of constant power, or constant energy. Identical results were obtained in each case. The ratio represents the efficiency of the POSL process when measured in "Mode II" and the data support the theoretical considerations described above.

2. Results and Discussion a. Wavelength Dependence, Filtering and Background

The dependence of the POSL output on the wavelength of the stimulating light was investigated previously using the different lines available from the Ar-ion laser.[5] The intensity of the POSL signal was observed to monotonically increase with decreasing wavelength. A weak, broad selectivity was noticeable near 470 nm, and this may be of the same origin as the high selectivity stimulation band measured by Springis et al.[8]

The wavelength dependence of the PTTL signal resulting from the transfer of charge from the main dosimetric trap to shallow traps, also indicates a monotonic growth of efficiency with decreasing wavelength over this same wavelength range.[9] One can conclude that blue light (<500 nm) is more efficient for OSL production than green light (e.g. the main 514 nm line from an Ar-ion laser). However, the use of shorter wavelength light also produced a background POSL signal from unirradiated α-Al$_2$O$_3$:C. The background signal is in the same wavelength region as the POSL signal and thus it could not be removed using filters. Therefore, in almost all of our dosimetric measurements we used the 514 nm line—which is also the strongest line from the Ar-ion laser. The lower efficiency for green light was compensated by the higher power, in addition to having a lower background signal and a lower dose threshold. A 514 nm interference filter was used to separate the 514 nm line from the other, unwanted components from the laser.

A 5–58 filter, with a maximum transmission at approximately 400 nm, was used to eliminate another source of background from unirradiated detectors—namely, that connected with traces of Cr impurity. The emission spectrum of this background signal was detected using a spectrograph and an EG&G optical multichannel analyzer. The background spectrum was found to match that of the R-line at 694 nm from Cr$^{3+}$ions. The same system of shutters that was used for the POSL measurements was used to protect the spectrometer from the laser light. With this arrangement the delay between the "stimulation" and the "emission" shutters was 20 ms, thus the fact that the $Cr^{3+}$R-line, which has a 4 ms lifetime, can be observed in these measurements indicates that the source of this signal is energy transfer from F-centers to the $Cr^{3+}$ions. This probably occurs through re-absorption of the 420 nm F-center emission by the Cr absorption band at 410 nm. 330 nm F+-center emission, which has a lifetime <7 ns[10], could not be measured using this arrangement.

b. Dose and Power Dependence

Figure 4:
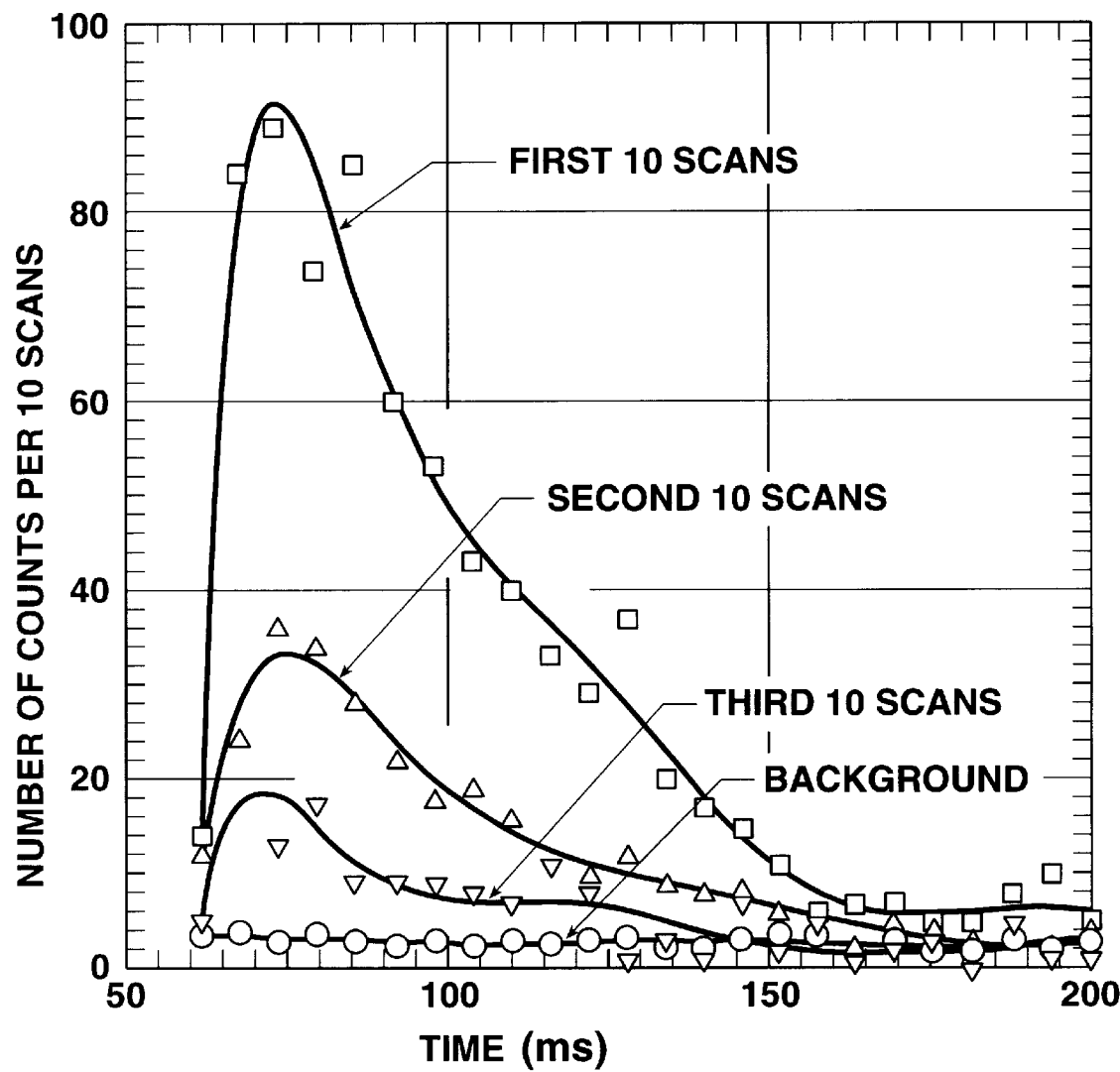
FIG. 4 is a graph expressing POSL after a dose of 30 $\mu$Gy of $^{137}$Cs at room temperature, using "Mode II". The accumulated counts from the first 10, the second 10 and the third 10 laser pulses are shown, as a function of time after the laser pulse. The background signal from an unirradiated sample is also shown.
Figure 5:
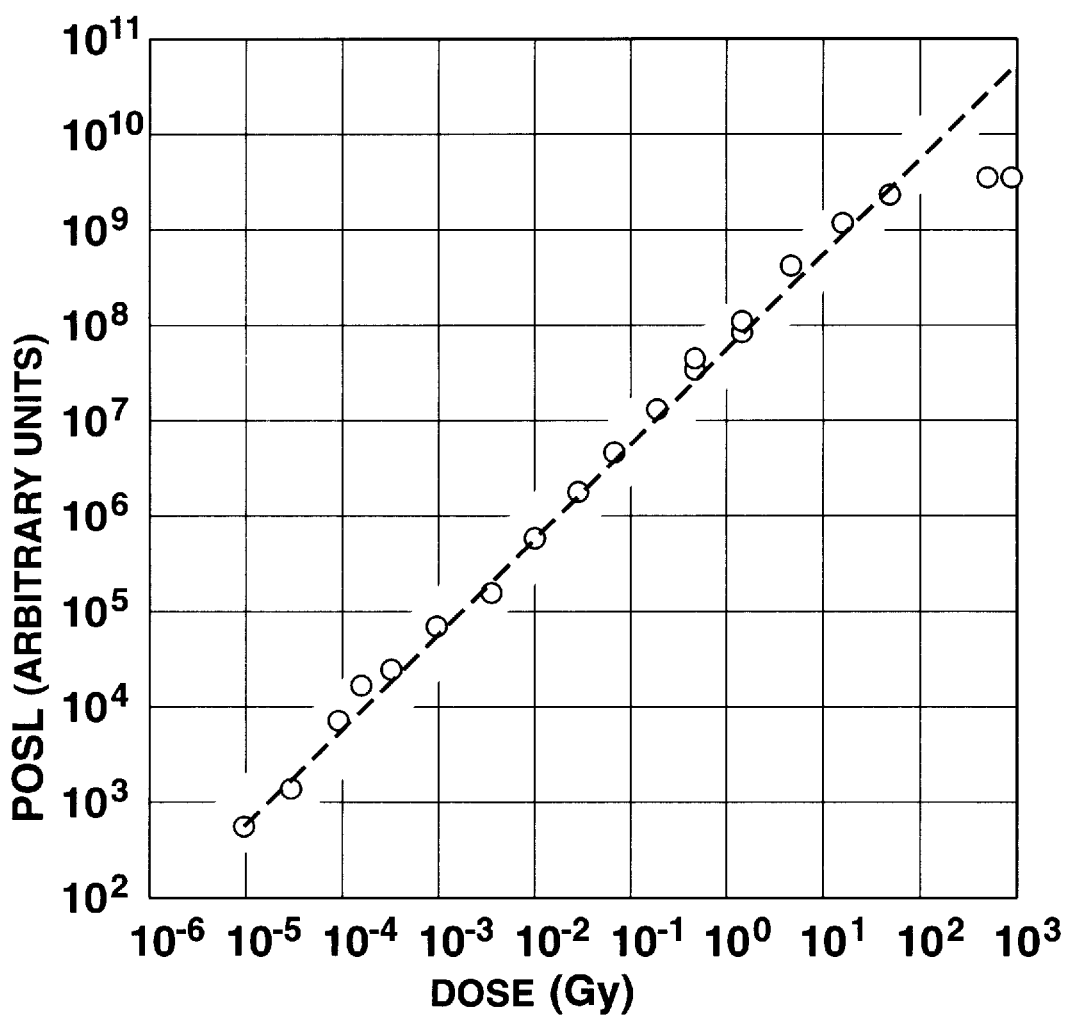
FIG. 5 is a graph expressing the dose dependence of the POSL signal, measured using "Mode II", as a function of absorbed dose (from either $^{90}$Sr/$^{90}$Y or $^{137}$Cs sources). The dashed line gives the line of linearity.

As a result of the above optimization efforts, doses as low as 5 µGy from a $^{137}$Cs source could be measured using only 10 laser pulses. FIG. 4 shows some relevant data for a dose of 30 µGy. The dose response was found to be linear from 5 µGy to 100 Gy and is shown in FIG. 5. To cover this range, using only the photon counting mode of the PMT, the laser power was changed twice (from 2.85 W, to 0.6 W and to 0.1 W) with the highest power being used for the lowest doses. The possibility of controlling the laser power adds flexibility to this dosimetric technique and increases the dynamic range to 7–8 decades. The POSL signal was found to be linear with laser power up to 2.85 W. Saturation was not reached with the laser powers available with the current system.

c. Time Dependence

Two types of time dependence were investigated: the decay of the luminescence after the laser pulse (afterglow decay), and the decay of the of the POSL signal as a function of the number of laser pulses (trap depletion). As discussed in the earlier study[5] the former has two components—a "fast", temperature-independent component with a lifetime of ~35 ms, and a "slow" temperature-dependent component with a variable lifetime from 400–5000 ms. The latter component is phosphorescence resulting from retrapping of the charge carriers by shallow traps (specifically, those traps responsible for TL peaks at 265 K and 310 K [5,7]), and the variation of its decay time can be attributed to variations in the concentrations of the different shallow traps contributing to the signal. Elevating the temperature of the POSL measurement to 335–375 K results in an approximately two-fold increase in the POSL sensitivity. The cause of this is discussed in detail elsewhere[7], but it can be very useful for practical dosimetry systems since it results in a higher intensity and a shorter data acquisition time. An additional, relevant observation is that the ratio of the "fast" to the "slow" component was found to be dependent upon the wavelength of the stimulating light. The intensity of the "fast" component was found to increase with respect to that of the "slow" component with an increase in laser wavelength.

Figure 6:
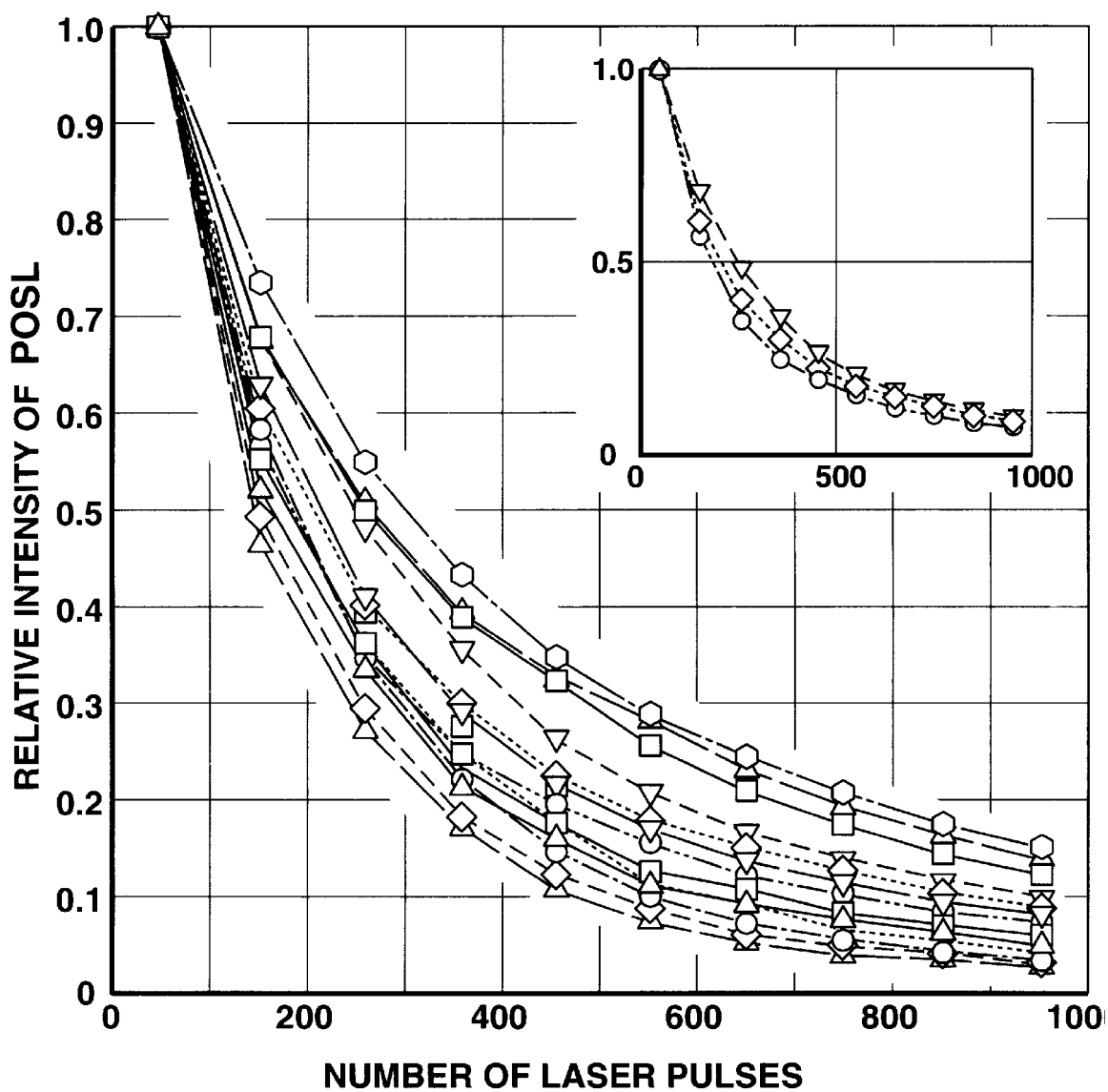
FIG. 6 is a graph expressing the normalized decay of the POSL signal versus the total number of laser pulses, for 16 different samples. Inset: the same data for a pre-selected subset of samples, chosen on the basis of the similarity in the FWHM of the TL peak.

The decay of the POSL signal as a function of the number of laser pulses is shown in FIG. 6. These data are important for an estimation of the optimum parameters for a practical OSL dosimetry system and for developing an algorithm for routine dose assessment. These measurements can also be used to evaluate the required optical bleaching time and laser power for zeroing the POSL signal when heating of the detector is not desirable (e.g. when using plastic dosimeters). The decay rates of 16 different, $\alpha$-$Al_2O_3$:C samples were measured as a function of the number of laser pulses.

Isochronal annealing experiments showed that if the POSL is measured after an irradiated sample has been preheated to a given temperature a major decay step is observed in the temperature range in which the main TL peak (i.e. the "450 K" peak) occurs. This indicates that the POSL signal being measured is a result of the optical emptying of charge from the main dosimetric trap. However, the decay rates observed in FIG. 6 vary considerably from sample to sample. It was determined that the POSL decay rates were correlated with the shape (i.e. FWHM) of the main 450 K TL peak from the same samples. This was found to vary by up to 50% (from 50 to 75 K). The longer decay constants correspond to a wider TL peak. Detectors preselected by the shape of the TL peak were found to have approximately the same decay curve—as illustrated in the inset to FIG. 6. A wide TL peak may be an indication of a wide spread, or distribution, of thermal activation energies for the production of TL. Correspondingly, one might also expect a wide distribution in optical trap depths. Thus, the observed longer decay of the POSL signal may be a result of a smaller efficiency of depletion of the deeper traps using 514 nm laser light. In support of this it was observed that when shorter wavelength light was used (454 nm), at the same laser power, the depletion rate was faster. From the isochronal annealing experiments, and from PTTL measurements[9], it was estimated that, at 514 nm, less than 1% of the POSL signal originates from the detrapping of charge from deep traps. The deep traps may be probed by using shorter wavelengths[9].

d. Comparison with TL and COSL

Back-to-back measurements of the intensity of the POSL, TL and COSL were made keeping the sample, absorbed dose, and optical arrangement the same. A $^{90}$Sr/$^{90}$Y dose of 68 mGy was given to the sample. For the POSL measurement a 514 nm laser pulse of 79 mW at 30 ms was used, with a photon counting gate time of 4 ms and a dwell time of 6 ms. For TL the heating rate was ~1.0 K/s, and for COSL the heating rate was ~1.5 K/s. In both cases the same gate and dwell times were used. The ratio of the total accumulated counts for these measurements was POSL/TL/COSL =3.5/1.0/0.5. Thus, the POSL measurement was observed to be 3.5 more sensitive than the TL measurement, and 7 times more sensitive than the COSL measurement. The TL measurement in particular is dependent upon heating rate, due to the thermal quenching properties of the luminescence.[3] Furthermore, the POSL measurement was not optimized in terms of pulse width, as described in the discussion of FIG. 3. Despite these limitations, the comparison illustrates the greater intrinsic sensitivity of POSL compared to these other measurement techniques. These differences in the sensitivities of the three types of measurement can be understood from a consideration of the accepted models for these processes, as described by Botter-Jensen and McKeever.[2]

3. Conclusions

The use of pulsed OSL from $\alpha$-$Al_2O_3$:C has been shown to be a viable dosimetric tool. Sensitivities greater than those of TL and COSL have been observed and doses low enough for personal dosimetry and environmental dosimetry can easily be measured. Since the POSL readout method is all-optical, and is intrinsically fast and sensitive, its introduction opens several potential applications not possible with conventional TL dosimetry. For example, smaller amounts of detector, ultra-thin layers, rapid throughput of large numbers of dosimeters, use of plastic dosimeters, short exposure times, multiple dose assessment, and dose-imaging. The flexibility afforded by the use of different laser powers, pulse widths and wavelengths indicates that POSL can be developed into a very versatile dosimetric system.

Other Parameters and Requirements

Following the collection of the above data, other parameters and requirements were discovered in the course of developing the present invention.

1. Lifetime of the Luminescence Centers

It has been discovered that the luminescent dosimetric material must have a lifetime of the luminescence centers longer than 15 μs. This requirement results from following considerations:

(a) From experiments using a flashlamp it was experimentally determined that the relaxation time of the PMT after the laser pulse is from 5 to 30 μs.

(b) The pulse duration for the lasers and flash lamps is not longer than 10 μs;

(c) To achieve a high efficiency of data acquisition the "dead-time" needed to perform a stimulation (laser) pulse and PMT relaxation, during which time the luminescence is not measured, should not be longer than 10% of the time period between pulses of stimulation.

(d) The shortest "dead-time" can be estimated for 10 ns of laser pulse and 5 μs for PMT relaxation as equal to approximately 5 μs with 5/0.1=50 μs period between pulses of stimulation. As a result, the maximum repetition rate of stimulation pulses is estimated as 20,000 Hz. This is the maximum possible repetition rate.

(e) Due to the exponential decay of luminescence between pulses of stimulation, the period of time between pulses should not be longer than three lifetimes of luminescence. Three lifetimes corresponds to 95% of total light output between pulses. The opposite requirement to the lifetime is: it should be at least ⅓ of the shortest possible time period between pulses of stimulation and can be estimated as 50/3=16.6 μs.

(f) in the most difficult case of a long stimulation pulse and large relaxation time of the PMT, the minimum time period between pulses can be estimated as (30+10)/0.1 =400 μs. This corresponds to 2500 Hz of repetition rate and a minimum lifetime of luminescence decay of 400/3=133 μs.

2. Radiation-Induced Absorption

It is also necessary that the radiation-induced absorption of the luminescent dosimetric material, within the wavelength range of stimulation, be sufficiently high.

3. Pulsing of Illumination Beam

It is important to pulse the illumination beam for a period of time that is at least 10 times smaller than the lifetime of the luminescence centers. One tenth of a luminescence lifetime corresponds to about 9.5% of the total luminescence to be lost during the stimulation pulse. To achieve a high efficiency of measurement the pulse duration and the "dead-time" for data acquisition must be minimized.

4. Wavelength of Laser Stimulation The preferred wavelength of laser stimulation is within the wavelength range of the radiation-induced absorption ability of the luminescent dosimetric material. In the case of anion-deficient, $Al_2O_3$, a wide radiation-induced absorption band between 300 and 600 nm is observed, and wavelengths withi this range may be used for optical stimulation.

The wavelength of light stimulation is also chosen in such a way that there is no photo-ionization of the unirradiated detector. For anion-deficient $Al_2O_3$, photo-ionization causes a signal that is indistinguishable from a radiation-induced signal. This takes place at same wavelengths of stimulation shorter than 300 nm. Photoionization causes a background signal that is not related to the radiation dose that has to be measured.

5. Concentration of F Centers

A concentration of F centers of $10^{16}$–$10^{18}$ $cmr^{-3}$ and a concentration of $F^+$ centers of $10^{15}$–$10^{17}$ $cmn^{-3}$ are preferred because among all crystals that were investigated, crystals with these defect concentrations exhibit the highest sensitivity in OSL measurements, the concentrations of these centers being determined by measurement of the intensity of optical absorbtion at 205 nm and 255 nm, respectively.

6. F Center Luminescence Lifetime

35±5 ms of lifetime is the characteristic lifetime of F center luminescence $Al_2O_3$. This lifetime matches well with general requirements of the described method.

Whereas, the present invention has been described in relation to the drawings attached hereto, it should be understood that other and further modifications, apart from those shown or suggested herein, may be made within the spirit and scope of this invention.

Bibliography (1) D. J. Huntley, D. L. Godfrey-Smith and M. L. W. Thewalt, *Optical Dating of Sediments*, Nature 313, 105–107 (1985).

(2) L. Bøtter-Jensen and S. W. S. McKeever, *Optically Stimulated Luminescence Dosimetry using Natural and Synthetic Materials*, Radiat. Prot. Dosim. 65, 273–279 (1996).

(3) Akselrod, M. S., Kortov, V. S. and Gorelova, E. A., *Preparation and Properties of α-$Al_2O_3$:C*, Radiat. Prot. Dosimn. 47, 159–164 (1993).

(4) Summers, G. P., *Thermoluminescence in Single Crystal α-$Al_2O_3$*, Radiat. Prot. Dosim., 8, 69–80 (1984).

(5) Markey, B. G., Colyott, L. E. and McKeever, S. W. S., *Time-Resolved, Optically Stimulated Luminescence from α-$Al_2O_3$:C*, Radiat. Meas. 24, 457–463 (1995).

(6) Miller, S. D. and Yoder, C., *Cooled Optically Stimulated Luminescence Dosimetry in Plastic Matrices*, Radiat. Prot. Dosim. 66, 89–93 (1996).

(7) S. W. S. McKeever, M. S. Akselrod, L. Bøtter-Jensen, L. E. Colyott, N. Agersnap Larsen, and B. G. Markey, *Temperature Dependence of Optically Stimulated Luminescence from α-$Al_2O_3$:C*, Radiat. Prot. Dosim. 65, 185–189 (1996).

(8) Springis, M., Kulis, P, Veispals, A. and Tale, I., *Photo- and Thermolstimulated Processes in α-$Al_2O_3$:C*, Radiat, Meas. 24, 453–456 (1995).

(9) Colyott, L. E., Akselrod, M. S. and McKeever, S. W. S., *Phototransferred Thermoluminescence in α-$Al_2O_3$:C*, Radiat. Prot. Dosim. 65, 263–266 (1996).

(10) Evans, B. D. and Staplebroek, M., *Optical Properties of the $F^+$-center in Crystalline $Al_2O_3$*, Phys. Rev. B, 18, 7089–7098 (1978).

What is claimed is:

1. A selectively bimodal method for determining an unknown absorbed dose of radiation using optically stimulated luminescence from a suitable luminescent material, comprising:

(a) mounting an irradiated sample of said luminescent material in the path of an illumination beam, said sample having a plurality of lattice defects and impurities acting as dosimetric traps and luminescence centers, said sample having a lifetime of luminescence centers of at least 15 μs and having a radiation-induced absorption ability;

(b) pulsing said illumination beam for a period of time that is at least 10 times smaller than said lifetime of said luminescence centers, the wavelength of said illumination beam being within the wavelength range of the radiation-induced absorption ability of said luminescent material and being unable to produce photoionization of unirradiated luminescent material, the photon flux density of said illumination beam being insufficient to heat said luminescent material to a temperature above that which would cause thermal quenching of said luminescence centers or that which represents thermal emptying of said dosimetric traps, leading to thermoluminescence of said luminescent material;

(c) detecting a luminescence signal from said luminescent material with a photodetector after a time delay following said pulsing of said illumination beam, said luminescence signal being emitted at a wavelength different from the wavelength of said illumination beam, said time delay serving the purpose of allowing said photodetector to relax after said pulsing;

(d) in a first mode, choosing the number of illumination pulses, each being followed by said time delay and by periods during which said luminescence signal is detected, and choosing a total illumination light energy sufficient to completely, or almost completely, extract all radiation-induced luminescence from said sample, or alternativel;

(e) in a second mode, choosing the number of illumination pulses, each being followed by said time delay and by periods during which said luminescence signal is detected, sufficient to extract only a portion of said radiation-induced luminescence from said sample, the amount of said illumination light energy being precisely measured and determined in order to perform two or more measurements on the same said sample after the same irradiation for the purpose of absorbed dose re-estimation; and (f) in either of said modes, comparing said luminescence signal with calibrated luminescence signals attributable to known doses of irradiation in order to determine said unknown absorbed dose of said irradiation.

2. The method according to claim 1 wherein:

(a) said luminescent material comprises crystalline anion-deficient aluminum oxide with an F-center concentration of $10^{16}$–$10^{18}$ mc$^{-3}$, giving rise to optical absorption at 205 nm, an F$^+$-center concentration of $10^{15}$–$10^{17}$ cm$^{-3}$, giving rise to optical absorption at 255 nm, and a luminescence lifetime at room temperature of 35±5 ms; and (b) said illumination beam has a wavelength in the range of 300–600 nm.

3. The method according to claim 1 wherein two or more different illumination beam wavelengths, but still within the wavelength range of radiation-induced absorption ability of said luminescent material, are pulsed to stimulate two or more of said traps having different optical depths in said luminescent material.

4. The method according to claim 1 wherein:

(a) said luminescent material comprises crystalline anion-deficient aluminum oxide with an F-center concentration of $10^{16}$–$10^{18}$ cm$^{-3}$, giving rise to optical absorption at 205 nm, an F$^+$-center concentration of $10^{15}$–$10^{17}$ cm$^{-3}$, giving rise to optical absorption at 255 nm, and a luminescence lifetime at room temperature of 35±5 ms; and (b) said illumination beam wavelengths are in the range of 300–600 nm.

5. The method according to claim 3 further comprising controlling the number of said pulses with an electronic shutter, mechanical shutter, beam polarizer or liquid crystal modulator.

6. The method according to claim 1 wherein the intensity of said illumination beam is adjusted appropriate to the dose range being studiedkin order to achieve a dynamic range of absorbed dose of at least seven (7) orders of magnitude.

7. A selectively bimodal method for the determination of an unknown absorbed dose of radiation using optically stimulated luminescence from a suitable luminescent material having luminescence centers with a lifetime longer than 15 $\mu$s, comprising:

(a) mounting an irradiated sample of said luminescent material in the path of an illumination beam;

(b) stimulating luminescence from said irradiated sample using a light pulse from said illumination beam;

(c) after a delay period between the end of said light pulse and the start of measurement, measuring the luminescence generated from said luminescent material to obtain a luminescence signal and either completely extracting all radiation-induced luminescence from said material or extracting only a portion of said radiation-induced luminescence, said light pulse and said delay period being of a combined duration shorter than said lifetime of said luminescence centers; and (d) comparing said luminescence signal with calibrated luminescence signals attributable to known doses of irradiation in order to determine said unknown absorbed dose of said irradiation.

8. The method according to claim 7, wherein said illumination beam has a wavelength in the range of 250–800 nm.

9. The method according to claim 7, wherein said light pulse has a width between 1 ns and 500 ms.

10. The method according to claim 9, wherein said light pulse has a width at least 10 times shorter than said lifetime of said luminescence centers.

11. The method according to claim 7, wherein said lifetime of said luminescence centers is 355 ms.

12. The method according to claim 7, further comprising successively pulsing said illumination beam and integrating said luminescence signal for comparison with integrated luminescence signals attributable to known doses of irradiation.

13. The method according to claim 12, wherein the period of time between successive pulses is not longer than three times said lifetime of said luminescence centers.

14. The method according to claim 12, wherein the maximum repetition rate for successive pulses does not exceed 20,000 Hz.

* * * * *